United States Patent
Takahashi et al.

(10) Patent No.: US 12,072,582 B2
(45) Date of Patent: Aug. 27, 2024

(54) TRANSPARENT SUBSTRATE FOR LIQUID CRYSTAL DEVICE, AND LIGHT CONTROL SHEET

(71) Applicant: TOPPAN Inc., Tokyo (JP)

(72) Inventors: Yusuke Takahashi, Taito-ku (JP); Yuji Kataoka, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 18/490,107

(22) Filed: Oct. 19, 2023

(65) Prior Publication Data

US 2024/0077766 A1     Mar. 7, 2024

Related U.S. Application Data

(63) Continuation of application No. PCT/JP2022/018614, filed on Apr. 22, 2022.

(30) Foreign Application Priority Data

Apr. 22, 2021   (JP) ................................. 2021-072531

(51) Int. Cl.
   *G02F 1/1337*    (2006.01)

(52) U.S. Cl.
   CPC .. *G02F 1/133788* (2013.01); *G02F 1/133784* (2013.01)

(58) Field of Classification Search
   CPC .............................................. G02F 1/133788
   See application file for complete search history.

(56) References Cited

U.S. PATENT DOCUMENTS

2003/0202137 A1* 10/2003 Nakamura ........... G02B 5/3033
                                                      349/96
2014/0106131 A1    4/2014 Ikai et al.

FOREIGN PATENT DOCUMENTS

| JP | H07-239484 A |   | 9/1995 |   |
|----|--------------|---|--------|---|
| JP | H07-270763 A |   | 10/1995 |  |
| JP | 2008233269 A | * | 10/2008 | ........... G02F 1/1333 |
| JP | 2014-058052 A |  | 4/2014 |  |
| JP | 2014-095896 A |  | 5/2014 |  |
| JP | 2015-007732 A |  | 1/2015 |  |
| JP | 2016-107504 A |  | 6/2016 |  |

(Continued)

OTHER PUBLICATIONS

JP 2008233269 A machine translation (Year: 2008).*
International Search Report issued Jul. 12, 2022 in PCT/JP2022/018614 filed Apr. 22, 2022, 7 pages.

*Primary Examiner* — James A Dudek
(74) *Attorney, Agent, or Firm* — Oblon, McClelland, Maier & Neustadt, L.L.P.

(57) ABSTRACT

A transparent substrate for a liquid crystal device includes an alignment layer that regulates an alignment direction of liquid crystal molecules contained in a liquid crystal layer of the liquid crystal device, and a base layer on which the alignment layer is formed. The transparent substrate includes a first surface and a second surface opposite the first surface. The first surface is a surface of the alignment layer, and the second surface is a surface of the base layer. The coefficient of static friction between the first surface and the second surface is less than or equal to 1.3. The transparent substrate has a hardness of F or higher in a pencil harness test on the first surface or on a surface of the base layer opposite the second surface.

18 Claims, 2 Drawing Sheets

(56) References Cited

FOREIGN PATENT DOCUMENTS

| WO | WO 2017/146217 | 8/2017 |
|----|----------------|--------|
| WO | WO 2012/043295 A1 | 4/2021 |

* cited by examiner

TRANSPARENT SUBSTRATE FOR LIQUID CRYSTAL DEVICE, AND LIGHT CONTROL SHEET

CROSS-REFERENCE TO RELATED APPLICATIONS

The present application is a continuation of and claims the benefit of priority to International Application No. PCT/JP2022/018614, filed Apr. 22, 2022, which is based upon and claims the benefit of priority to Japanese Application No. 2021-072531, filed Apr. 22, 2021. The entire contents of these applications are incorporated herein by reference.

BACKGROUND OF THE INVENTION

Field of the Invention

The present invention relates to a transparent substrate for a liquid crystal device, and a light control sheet.

Description of Background Art

For example, WO 2017/146217 describes a reverse type light control sheet including a light control layer, a pair of conductive layers sandwiching the light control layer, and an alignment layer positioned between the light control layer and each of the conductive layers. The entire contents of this publication are incorporated herein by reference.

SUMMARY OF THE INVENTION

According to one aspect of the present invention, a transparent substrate for a liquid crystal device includes a base layer, and an alignment layer formed on the base layer such that the alignment layer has a surface forming a first surface of the transparent substrate and that the base layer has a surface forming a second surface of the transparent substrate on the opposite side with respect to the first surface. The alignment layer regulates an alignment direction of liquid crystal molecules in a liquid crystal layer of a liquid crystal device, the base layer and the alignment layer are formed such that a coefficient of static friction between the first surface and the second surface is 1.3 or less, and the transparent substrate has a hardness of F or higher in a pencil harness test on the first surface or on a surface of the base layer opposite the second surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
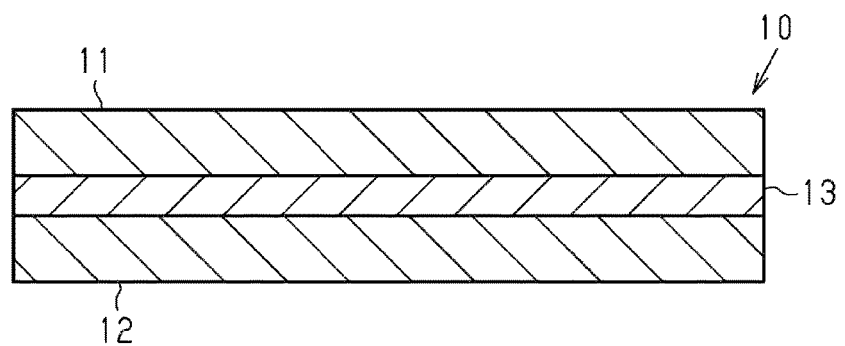
FIG. 1 is a cross-sectional view schematically illustrating a structure of a light control sheet according to a first embodiment of the present invention.

Embodiments will now be described with reference to the accompanying drawings, wherein like reference numerals designate corresponding or identical elements throughout the various drawings.

First Embodiment

A transparent substrate for a liquid crystal device and a light control sheet according to a first embodiment of the present invention will be described with reference to FIGS. 1 to 3.

Light Control Sheet

A light control sheet will be described with reference to FIG. 1. As illustrated in FIG. 1, the light control sheet 10 includes a first substrate 11, a second substrate 12, and a light control layer 13. The light control layer 13 is disposed between the first substrate 11 and the second substrate 12. The light control layer 13 contains liquid crystal molecules. The light control layer 13 is an example of a liquid crystal layer. In the light control layer 13, the liquid crystal molecules may be held in a polymer network type (Polymer Network Liquid Crystal (PNLC)) or a polymer dispersed type (Polymer Dispersed Liquid Crystal (PDLC)). The liquid crystal molecules have negative dielectric anisotropy. In other words, liquid crystal molecules are of the n-type. The type of light control sheet 10 is the reverse type.

Each of the first substrate 11 and the second substrate 12 is an example of a transparent substrate for a liquid crystal device. Each of the substrates 11, 12 has transparency to visible light. Each of the substrates 11, 12 includes an alignment layer. The alignment layer regulates the alignment direction of the liquid crystal molecules contained in the light control layer 13. The alignment layer is a vertical alignment film. Each of the substrates 11, 12 is in contact with the light control layer 13. In each of the substrates 11, 12, the surface in contact with the light control layer 13 is a first surface. The structure of each of the substrates 11, 12 will be described in more detail below with reference to FIG. 2.

Transparent Substrate for Liquid Crystal Device

The transparent substrate for a liquid crystal device will be described with reference to FIG. 2. FIG. 2 illustrates a cross-sectional structure of the first substrate 11 that is an example of the transparent substrate for a liquid crystal device. While the position of the second substrate 12 in the thickness direction of the light control sheet 10 differs from that of the first substrate 11, layers in the second substrate 12 are common to those in the first substrate 11. For this reason, the structure of the first substrate 11 will be described in detail below, while a detailed description of the structure of the second substrate 12 will be omitted.

Figure 2:
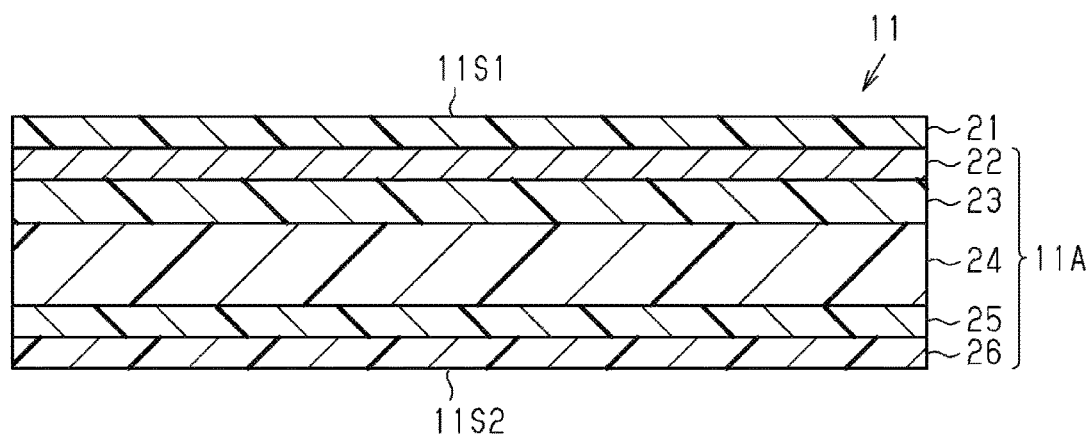
FIG. 2 is a cross-sectional view illustrating a structure of a transparent substrate for a liquid crystal device in the light control sheet according to the first embodiment of the present invention.

As illustrated in FIG. 2, the first substrate 11 includes an alignment layer 21 and a base layer 11A on which the alignment layer 21 is formed. The alignment layer 21 is in contact with the base layer 11A. The first substrate 11 has a first surface 11S1 and a second surface 11S2 opposite the first surface 11S1. The first surface 11S1 is the surface of the alignment layer 21. The second surface 11S2 is the surface of the base layer 11A. The coefficient of static friction between the first surface 11S1 and the second surface 11S2 is 1.3 or less. The substrate 11 has a hardness of F or higher in a pencil harness test on the first surface 11S1 or on the surface opposite of the base layer 11A from the second surface 11S2.

The pencil harness test is conducted in accordance with JIS K 5600-5-4: 1999 "General Testing Methods for Paints—Part 5: Mechanical Property of Coating Film—Section 4: Scratch Hardness (Pencil Method)".

The base layer 11A includes a hard coat layer 23. The first substrate 11 has a hardness of F or higher in the pencil harness test on the surface opposite the second surface 11S2 of the base layer 11A. According to the first substrate 11, since the high pencil hardness of the base layer 11A is achieved by the hard coat layer 23, the alignment layer 21 does not need to have both the function of regulating the alignment of the liquid crystal molecules and the high hardness. Therefore, as compared to the case where the alignment layer 21 itself has high pencil hardness, it is possible to reduce restrictions on the configuration of the alignment layer 21, including a thickness and a material.

The base layer 11A includes a conductive layer 22 in contact with the alignment layer 21. The conductive layer 22 is disposed between the hard coat layer 23 and the alignment layer 21 in the thickness direction of the first substrate 11. Since the conductive layer 22 is positioned between the alignment layer 21 and the hard coat layer 23 in the thickness direction of the first substrate 11, application of a voltage to the conductive layer 22 can readily form an electric field with an intensity that enables the liquid crystal molecules to be driven, between the conductive layer 22 of the first substrate 11 and the conductive layer of the second substrate 12.

The base layer 11A includes a support substrate 24, an adhesive layer 25, and a protective layer 26. The adhesive layer 25 is laminated to the support substrate 24. The protective layer 26 is adhered to the support substrate 24 by the adhesive layer 25. The protective layer 26 includes a second surface 11S2. According to the first substrate 11, the protective layer 26 including the second surface 11S2 is provided separately from the support substrate 24, which allows restrictions on the configuration of the support substrate 24, including a thickness and a material, to be reduced as compared to the case where the support substrate 24 includes the second surface 11S2.

The strength of the hard coat layer 23 is higher than that of the support substrate 24. Therefore, the hardness on the surface of the alignment layer 21 formed on the base layer 11A is also higher than in the case that the base layer 11A does not include the hard coat layer 23.

The support substrate 24 has a pair of opposing surfaces in the thickness direction of the first substrate 11. The surface roughness of the second surface 11S2 of the protective layer 26 is higher than the surface roughness of at least one of the pair of surfaces of the first substrate 11, which is in contact with the adhesive layer 25. The surface roughness is the arithmetic mean roughness Ra as specified in JIS B 0601:2013 "Geometrical Product Specifications (GPS)—Surface Texture: Profile Method—Terms, Definitions and Surface Texture Parameters."

The alignment layer 21 is a vertical alignment layer. The alignment layer 21 aligns the liquid crystal molecules such that the long axis of each liquid crystal molecules is perpendicular to the plane in which the alignment layer 21 extends. The angle between the alignment layer 21 and the long axis of each liquid crystal molecule may deviate from a right angle as long as the angle can be considered to be substantially a right angle. The alignment layer 21 is made of, for example, a polyamic acid, polyimide, polyvinyl alcohol (PVA) or the like. The surface of the alignment layer 21 may be rubbed. The thickness of the alignment layer 21 may be, for example, 20 nm or more and 500 nm or less. The alignment layer 21 has transparency to visible light.

The conductive layer 22 is made of, for example, a transparent conductive oxide (TCO). The TCO may be, for example, indium tin oxide (ITO), zinc oxide (ZnO), tin oxide ($SnO_2$), indium zinc oxide (IZO), and indium gallium-zinc oxide (IGZO). The conductive layer 22 may have a thickness of 5 nm or more and 100 nm or less, for example. The conductive layer 22 has transparency to visible light.

The hard coat layer 23 may be made of, for example, any of organic, silicon, and inorganic materials. The organic material may be a synthetic resin, such as a melamine resin, a urethane resin, or an acrylic resin. The silicon material may be a silane compound. The inorganic material may be a metal oxide. The hard coat layer 23 may have a thickness of 1 μm or more and 10 μm or less, for example. The hard coat layer 23 has transparency to visible light. The hard coat layer 23 is not limited to a single layer structure but may have a multilayer structure. In the case where the hard coat layer 23 has a multilayer structure, the hard coat layer 23 may include a first layer made of a first material and a second layer made of a second layer different from the first material.

The support substrate 24 is made of, for example, a synthetic resin. The synthetic resin may be, for example, polyethylene terephthalate (PET) or polyethylene naphthalate (PEN). The support substrate 24 may have a thickness of 16 μm or more and 250 μm or less, for example. The support substrate 24 has transparency to visible light. The support substrate 24 is not limited to having a monolayer structure but may have a multilayer structure. In the case where the support substrate 24 has a multilayer structure, the support substrate 24 may include a first layer made of a first material and a second layer made of a second material different from the first material.

The adhesive layer 25 is made of any of various types of adhesives. The adhesive may be, for example, a rubber adhesive, an acrylic adhesive, or a silicone adhesive. The adhesive layer 25 may have a thickness of 2 μm or more and 100 μm or less, for example. The adhesive layer 25 has transparency to visible light.

The protective layer 26 is made of a synthetic resin. The synthetic resin may be, for example, polyester terephthalate (PET), polyethylene (PE), polypropylene (PP), or polyolefin (PO). The protective layer 26 may have a thickness of 25 μm or more and 188 μm or less, for example. The protective layer 26 has transparency to visible light.

Effects of the first substrate 11 will now be described with reference to FIG. 3.

When the light control sheet 10 is manufactured using the first substrate 11, the first substrate 11 is conveyed along the longitudinal direction of the first substrate 11 by a roll-to-roll apparatus. In this process, tension is applied to the first substrate 11 along the longitudinal direction, and the first substrate 11 is conveyed along the longitudinal direction while in contact with guide rolls provided in the roll-to-roll apparatus. Thus, when the first surface 11S1 of the first substrate 11 contacts each guide roll, friction is generated between the first surface 11S1 included in the alignment layer 21 and the guide roll. In a case where a frictional force acting on the first surface 11S1 exceeds the strength of the first surface 11S1, defects, which are physical damage, occur in a portion of the alignment layer 21 on which the frictional force has acted. The defects are portions of the alignment layer 21 that are missing.

Figure 3:
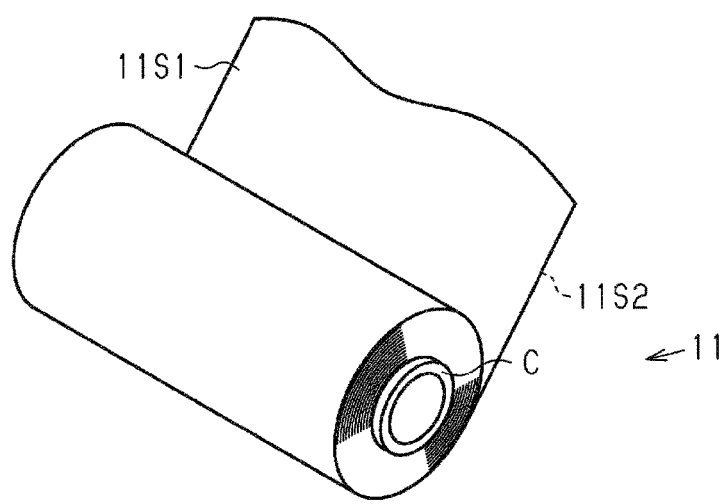
FIG. 3 is a perspective view of the transparent substrate for a liquid crystal device of the first embodiment of the present invention, when stored.

As illustrated in FIG. 3, the first substrate 11 is strip-shaped. Therefore, when the first substrate 11 is transported from a roll-to-roll apparatus to another device, or when the first substrate 11 is stored, the first substrate 11 is wound around the core C. When the first substrate 11 is wound around the core C, friction occurs between the first surface 11S1 and the second surface 11S2 of the first substrate 11. Upon the frictional force acting on the first surface 11S1 exceeding the strength of the first surface 11S1, a defect occurs in the portion of the alignment layer 21 on which the frictional force has acted.

When the first substrate 11 is transported, vibration is applied to the first substrate 11, which causes friction between a portion of the first surface 11S1 of the first substrate 11 and a portion of the second surface 11S2 in contact with that portion of the first surface 11S1 of the first substrate 11. Also in such a case, upon a frictional force exceeding the strength of the first surface 11S1 acting on the first surface 11S1, defects occur in portions of the alignment layer 21 on which the frictional force has acted.

In this regard, according to the first substrate 11, the coefficient of static friction between the first surface 11S1 and the second surface 11S2 is less than or equal to 1.3, so that when the first surface 11S1 is rubbed against the second surface 11S2, damage to the first surface 11S1 is suppressed. In addition, since the layer under the first surface 11S1 has a high pencil hardness, the first surface 11S1 is less likely to be damaged when an external impact is applied to the first surface 11S1. This allows physical damage to the alignment layer 21 to be suppressed.

As described above, since the alignment layer 21 is a very thin layer and has a thickness of up to a few hundred nanometers, the alignment layer 21 is considered to maintain enough strength to exist as a thin film by following the base layer 11A of the alignment layer 21. In this regard, since the first substrate 11 includes the hard coat layer 23 with a higher strength than the support substrate 24, it is considered that the strength of the base layer 11A is increased, and the strength of the alignment layer 21 that follows the base layer 11A, and thus the hardness at the first surface 11S1, are also increased.

The surface roughness of the second surface 11S2 included in the protective layer 26 is higher than the surface roughness of the support substrate 24, which suppresses an increase in the coefficient of static friction between the first surface 11S1 and the second surface 11S2, thereby suppressing an increase in the frictional force acting on the first surface 11S1.

EXAMPLES

Examples and comparative examples will be described with reference to Table 1.

Example 1-1

A PET film (COSMOSHINE A4300, manufactured by Toyobo Co., Ltd.) (COSMOSHINE is a registered trademark) with a thickness of 125 μm was prepared. A coating liquid to form the backside coating layer was obtained by adjusting an acrylic paint (LUCIFRAL NAB-016, manufactured by Nippon Paint Industrial Coatings Co., Ltd.) (LUCIFRAL is a registered trademark) with methyl ethyl ketone (MEK) to achieve a solid content of 40 wt. %. The coating liquid was applied to the second surface of the PET film using a gravure coater to form a coating film. After drying the coating film at 80° C. for 1 minute, the coating film was exposed using a high-pressure mercury vapor lamp at 300 mJ/cm$^2$ to form a backside coating layer with a thickness of 2 μm.

A coating liquid to form the hard coat layer was obtained by adjusting the paint (Lioduras LCH6701, manufactured by TOYOCHEM CO., Ltd.) (Lioduras is a registered trademark) for the hard coat layer, which is the base of the conductive layer, using MEK to make the solid content 50 wt. %. A coating film was obtained by applying the coating liquid on the first surface of the PET film using a gravure coater. After drying the coating film at 60° C. for 1 minute, a hard coat layer with a thickness of 2 μm was formed by exposing the coating film using a high-pressure mercury vapor lamp at 300 mJ/cm$^2$.

A PET film with the hard coat layer formed was placed in a roll-to-roll sputtering device. Next, the processing chamber of the sputtering device was evacuated to 0.4 Pa, and then argon gas and oxygen gas were introduced into the processing chamber. The target was sputtered by supplying electric power to a mixed sintered target of 90 wt. % indium oxide and 10 wt. % tin oxide. In this process, the temperature of the PET film was set to 40° C. This formed an ITO layer with a thickness of 50 nm on the hard coat layer. The ITO layer was then heated at 140° C. for 90 minutes to crystallize the ITO. The PET film with the ITO layer formed was wound onto a roll.

A protective film (SUNYTECT SAT-TM40125TG, manufactured by Sun A. Kaken Co., Ltd.) (SUNYTECT is a registered trademark) with an adhesive layer was prepared, and the protective film was adhered to the backside coating layer using a laminator. In this manner, the base layer of the transparent substrate for a liquid crystal device, on which the alignment layer is to be formed, was obtained.

A coating liquid for forming the alignment layer was obtained by adjusting a paint for the alignment layer (SUNEVER SE-H682, manufactured by Nissan Chemical Industries, Ltd.) (SUNEVER is a registered trademark), whose main ingredient is polyamic acid, with a solvent so that the solid content is 5 wt. %. In the solvent, the weight ratio of propylene glycol monomethyl ether to γ-butyl lactone was set as follows.

Propylene glycol monomethyl ether: γ-butyl lactone=8:2

A coating film was formed on the ITO layer of the base layer by applying the coating liquid using a roll coater. An alignment layer with a thickness of 100 nm was formed by drying the coating film at 150° C. for 5 minutes. This provided a transparent substrate for a liquid crystal device. The transparent substrate for a liquid crystal device was then wound onto a roll. The transparent substrate for a liquid crystal device was stored in a clean room at 23° C. and 50% relative humidity (RH) for 7 days. The transparent substrate for a liquid crystal device was then used to manufacture a light control sheet.

A pair of transparent substrates for a liquid crystal device ware prepared. Bead spacers dispersed in isopropyl alcohol (IPA) were applied on the alignment layer of one of the transparent substrates for a liquid crystal device. Each bead spacer had a diameter of 6 μm and was made mainly of divinylbenzene. The bead spacers were applied so that the area occupied by the bead spacers on the first surface was 1.5%. After drying the IPA at 100° C., the base layer with the bead spacers was wound onto a roll.

To form the light control layer, a mixed liquid was first prepared by mixing the following materials.

17.5 parts by weight of LOCTITE 3736 (registered trademark, manufactured by Henkel Japan Ltd.)

17.5 parts by weight of 1,9-nonanediol methacrylate

Next, the coating liquid for forming the light control layer was obtained by mixing 65 parts by weight of n-type liquid crystal (MLC-6608, manufactured by Merck & Co., Inc.) into a coating liquid.

The light control sheet was produced using a first unwinding device, a second unwinding device, a coating device equipped with a die head coater, an irradiation device equipped with a high-pressure mercury lamp, and a roll-to-roll apparatus equipped with a single winding device. The irradiation device was set so that light with a wavelength of 350 nm or less is not emitted. The transparent substrate for a liquid crystal device with bead spacers was pulled out from the first unwinding device, and a coating liquid to form a light control layer was applied onto the alignment layer with bead spacers using the die-head coater to form a coating film. Next, the coating liquid was irradiated with ultraviolet light for 30 seconds at 20 mW/cm$^2$ under a nitrogen atmosphere. In this process, the temperature in the irradiation device was set to 25° C. This cured the coating film to obtain a polymer network type light control layer. The light control sheet of Example 1 was obtained by laminating the transparent substrate for a liquid crystal device pulled out from the second unwinding device to the light control layer so that the alignment layer of the transparent substrate for a liquid crystal device is in contact with the light control layer. After laminating the transparent substrate for a liquid crystal device onto the light control layer, the light control sheet was wound onto a roll using the winding device to obtain a roll of the light control sheet.

Example 1-2

A light control sheet of Example 1-2 was obtained in the same manner as in Example 1-1, except that the protective film of Example 1-1 was changed to a different protective film (SAT4538T-JSL, manufactured by Sun A. Kaken Co., Ltd.).

Example 1-3

A coating liquid to form the hard coat layer was obtained by changing the paint to form the hard coat layer of Example 1-1 to a different paint (TP-203X coating agent, manufactured by Toyo Ink Co., Ltd.) and adjusting the paint using MEK so that the solid content was 50 wt. %. A coating film was obtained by applying the coating liquid on the PET film using a gravure coater. After drying the coating film at 60° C. for one minute, a hard coat layer with a thickness of 2 was formed by exposing the coating film using a high-pressure mercury vapor lamp at 250 mJ/cm$^2$. The light control sheet of Example 1-3 was obtained in the same manner as in Example 1-1 except for these differences.

Example 1-4

A light control sheet of Example 1-4 was obtained in the same manner as in Example 1-1, except that the thickness of the hard coat layer of Example 1-1 was changed to 5 μm.

Comparative Example 1-1

A light control sheet of Comparative Example 1-1 was obtained in the same manner as in Example 1-1, except that the protective film of Example 1-1 was changed to a different protective film (PT820, manufactured by Tamapoly CO., Ltd.).

Comparative Example 1-2

A light control sheet of Comparative Example 1-2 was obtained in the same manner as in Example 1-1, except that the hard coat layer of Example 1-1 was not formed.

Evaluation Method

Coefficient of Static Friction

For each of the examples and comparative examples of the base layer, the coefficient of static friction between the surface of the ITO film and the surface of the protective film was measured before forming the light control layer. The coefficient of static friction was measured using a portable friction meter (Tribogear Muse TYPE: 94i, manufactured by SHINTO Scientific Co., Ltd.) (Tribogear is a registered trademark).

Pencil Hardness

For each of the examples and comparative examples of the base layer, a pencil harness test was conducted on the surface of the ITO layer before forming the light control layer. In this process, a method in accordance with JIS K 5600-5-4: 1999 "General test methods for coating films— Part 5: Mechanical properties of coating films—Section 4: Scratch hardness (pencil harness test)" was used.

Counting of Defects

A test piece that is square in shape and had a length of 1 m per side was cut out from the light control sheet according to each of the examples and the comparative examples. The test piece to which no voltage was applied was irradiated with light using a three-wavelength light source with an illuminance of at least 1000 lux, and the light control sheet was visually observed from the side of the test piece opposite from the three-wavelength light source. Defects in each test piece were counted by assuming that a white turbid spot with a size of 2 mm or more was considered a defect. The white turbid spots are caused by insufficient alignment control force being exerted by the alignment layer, leading to the liquid crystal molecules not being aligned. Therefore, the white turbid spots may be regarded as spots where defects are occurring in the alignment layer.

Haze

An A3-size test piece was cut out from the light control sheet according to each of the examples and the comparative examples. For each test piece, a portion of each ITO layer was exposed to the outside, thereby forming a terminal for applying voltage to the light control sheet. After connecting a conductive wire to each terminal, an AC power supply device was connected to the conductive wire. For each test piece, the haze with no voltage being applied and the haze with a voltage of 40 V at 60 Hz being applied were measured. When measuring the haze, a method in accordance with JIS K 7136:2000 "Plastics—Determination of haze of transparent materials" was used.

Evaluation Result

The coefficient of static friction and pencil hardness of each base layer, as well as the number of defects and haze of each light control sheet, are shown in Table 1 below.

TABLE 1

| | Thickness of hard coat layer (μm) | Coefficient of static friction | Pencil hardness | Defects | Haze (%) 0 V | Haze (%) 40 V |
|---|---|---|---|---|---|---|
| Example 1-1 | 2 | 0.4 | H | 5 | 10 | 91 |
| Example 1-2 | 2 | 1.3 | H | 10 | 8 | 91 |
| Example 1-3 | 2 | 0.4 | F | 5 | 7 | 92 |
| Example 1-4 | 5 | 0.4 | 2H | 7 | 7 | 91 |
| Comparative example 1-1 | 2 | 1.5 | H | 50≤ | 6 | 90 |
| Comparative example 1-2 | 0 | 0.6 | 2B | 50≤ | 8 | 90 |

As shown in Table 1, the coefficient of static friction of the base layer of each of Example 1-1, Example 1-3, and Example 1-4 was observed to be 0.4, and the static friction coefficient of the base layer of Example 1-2 was observed to be 1.3. In contrast, the coefficient of static friction of the base layer of Comparative Example 1-1 was observed to be 1.5, and the coefficient of static friction of the base layer of Comparative Example 1-2 was observed to be 0.6.

The pencil hardness of the base layer of each of Examples 1-1 and 1-2 was observed to be H, the pencil hardness of the base layer of Example 1-3 was observed to be F, and the pencil hardness of the base layer of Example 1-4 was observed to be 2H. In contrast, the pencil hardness of the base layer of Comparative Example 1-1 was observed to be H, and the pencil hardness of the base layer of Comparative Example 1-2 was observed to be 2B.

The number of defects in the light control sheet of each of Examples 1-1 and 1-3 was observed to be 5 defects/m², the number of defects in the light control sheet of Example 1-2 was observed to be 10 defects/m², and the number of defects in the light control sheet of Example 1-4 was observed to be 7 defects/m². In contrast, the number of defects in the light control sheet of each of Comparative Examples 1-1 and 1-2 was observed to be 50 defects/m² or more.

Therefore, as for the transparent substrates for a liquid crystal device, it was observed that physical damage to the alignment layer is suppressed when the coefficient of static friction between the first and second surfaces of the base layer where the alignment layer is formed is less than or equal to 1.3 and the pencil hardness on the opposite side from the second surface is F or higher.

As described above, with the transparent substrate for a liquid crystal device and the light control sheet of the first embodiment, the following effects can be achieved.

According to the first substrate 11, the coefficient of static friction between the first surface 11S1 and the second surface 11S2 is less than or equal to 1.3, which can suppress damage to the first surface 11S1 caused by the first surface 11S1 rubbing against the second surface 11S2.

Since the first surface itself or the base layer of the first surface has a high pencil hardness, the first surface is less likely to be damaged when an external impact is applied to the first surface. This makes it possible to suppress physical damage to the alignment layer 21.

Since the high pencil hardness of the base layer 11A is achieved by the hard coat layer 23, it is possible to reduce restrictions on the configuration of the alignment layer 21, including a thickness and a material, as compared to the case where the alignment layer 21 itself has high pencil hardness.

Since the conductive layer 22 is positioned between the alignment layer 21 and the hard coat layer 23, application of a voltage to the conductive layer 22 can readily form an electric field with an intensity that enables the liquid crystal molecules to be driven, between the conductive layer 22 of the first substrate 11 and the conductive layer of the second substrate 12.

Since the protective layer 26 including the second surface 11S2 is provided separately from the support substrate 24, it is possible to reduce restrictions on the configuration of the support substrate 24, including a thickness and a material, as compared to the case where the support substrate 24 includes the second surface 11S2.

Second Embodiment

A transparent substrate for a liquid crystal device and a light control sheet according to a second embodiment will be described with reference to FIG. 4. The transparent substrate for a liquid crystal device of the second embodiment differs from the transparent substrate for a liquid crystal device of the first embodiment in that the transparent substrate for a liquid crystal device includes a lubricious layer. For this reason, the following describes in detail the components in the second embodiment that differ from those in the first embodiment, while detailed descriptions of the components in the second embodiment that are common to those in the first embodiment are omitted by assigning the same reference numerals as in the first embodiment.

Transparent Substrate for Liquid Crystal Device

The transparent substrate for a liquid crystal device will now be described with reference with FIG. 4. FIG. 4 illustrates a cross-sectional structure of the first substrate 11 that is an example of the transparent substrate for a liquid crystal device. While the position of the second substrate 12 in the thickness direction of the light control sheet 10 differs from that of the first substrate 11, layers in the second substrate 12 are common to those in the first substrate 11. For this reason, the structure of the first substrate 11 will be described in detail below, while a detailed description of the structure of the second substrate 12 will be omitted.

Figure 4:
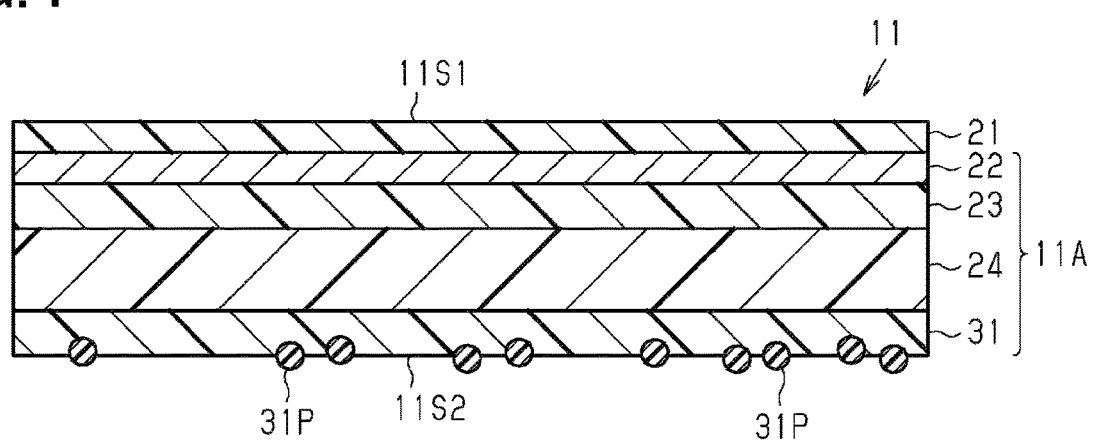
FIG. 4 is a cross-sectional view illustrating a structure of a transparent substrate for a liquid crystal device in a light control sheet according to a second embodiment of the present invention.

As illustrated in FIG. 4, the first substrate 11 includes the alignment layer 21 and the base layer 11A, as in the first substrate 11 of the first embodiment. The base layer 11A includes the conductive layer 22, the hard coat layer 23, and the support substrate 24, as in the first substrate 11 of the first embodiment. The first substrate 11 further includes a lubricious layer 31. The lubricious layer 31 includes microparticles 31P. The lubricious layer 31 includes a second surface 11S2. The plurality of microparticles 31P includes microparticles 31P that are partially exposed on the second surface 11S2. In other words, the plurality of partially exposed microparticles 31P are located on the second surface 11S2.

According to the first substrate 11, the lubricious layer 31 including the second surface 11S2 is provided separately from the support substrate 24, which allows restrictions on the configuration of the support substrate 24, including a thickness and a material, to be reduced as compared to the case where the support substrate 24 includes the second surface 11S2.

The arithmetic mean roughness Ra of the second surface 11S2 included in the lubricious layer 31 may be, for example, 5 nm or more and 94 nm or less. The arithmetic mean roughness Ra of 5 nm or more can reduce the coefficient of static friction between the first surface 11S1 and the second surface 11S2. The arithmetic mean roughness Ra of 94 nm or less prevents the lubricious layer 31 from including microparticles 31P to the extent that the haze of the base layer 11A increases, thereby preventing the haze from increasing when transparent in a liquid crystal device provided with the first substrate 11.

The lubricious layer 31 may be made of, for example, a synthetic resin. The synthetic resin may be, for example, any of a melamine resin, a urethane resin, and an acrylic resin. The lubricious layer 31 may have a thickness of 1 μm or more and 10 μm or less, for example. The thickness of the lubricious layer 31 is a thickness at the portion where the microparticles 31P are not present. The lubricious layer 31 is transparent to visible light.

The microparticles 31P may be made of, for example, a synthetic resin. When the microparticles 31P are used as primary particles, the diameter of the microparticles 31P is preferably greater than the thickness of the lubricious layer 31. In this case, the diameter of the microparticles 31P may be, for example, 1.5 μm or more and 15 μm and or less. It is also possible to use the microparticles 31P as secondary agglomerate particles, thereby reducing the coefficient of static friction by exposing the microparticles 31P from the lubricious layer 31. In this case, the diameter of the microparticles 31P may be less than the thickness of the lubricious layer 31. It is also possible to use the microparticles 31P as higher order particles.

Similar to the first substrate 11 of the first embodiment, the first substrate 11 of the second embodiment can also suppresses physical damage to the alignment layer 21 that may occur during conveyance of the first substrate 11 by the roll-to-roll apparatus, during winding of the first substrate 11 using the roll-to-roll apparatus, and during transportation of the wound first substrate 11.

EXAMPLES

Examples and comparative examples will be described with reference to Table 2.

Example 2-1

In Example 2-1, a light control sheet was obtained in the same manner as in Example 1-1, except that instead of adhering the protective layer to the PET film by means of an adhesive layer, a lubricious layer was formed in the manner described below. was obtained. That is, 0.2 wt. % of acrylic particles (Techpolymer SSX-102, manufactured by Sekisui Plastics Co., Ltd.) (Techpolymer is a registered trademark) with an average particle diameter of 2 μm was added to a paint for the lubricious layer (Lioduras LCH6701, manufactured by TOYOCHEM CO., LTD.) (Lioduras is a registered trademark). The coating liquid for forming the lubricious layer was obtained by adjusting the paint to which the acrylic particles were added using MEK so that the solid content was 40 wt. %. The coating liquid was applied to the first surface of PET film using a gravure coater to form a coating film. After drying the coating film at 80° C. for 1 minute, the coating film was exposed using a high-pressure mercury vapor lamp at 300 mJ/cm² to form a lubricious layer with a thickness of 1 μm in the area where no acrylic particles were present.

Example 2-2

A light control sheet of Example 2-2 was obtained in the same manner as in Example 2-1, except that the amount of acrylic particles added was changed to 1.5 wt. %.

Example 2-3

A light control sheet of Example 2-3 was obtained in the same manner as in Example 2-1, except that the amount of acrylic particles added was changed to 3.0 wt. %.

Example 2-4

A light control sheet of Example 2-4 was obtained in the same manner as in Example 2-1, except that the amount of acrylic particles added was changed to 0.1 wt. %.

Example 2-5

Instead of adhering the protective layer to the PET film by means of the adhesive layer of Example 1-3, a lubricious layer was formed in the same manner as in Example 2-1. In this case, the amount of microparticles added was changed to 0.3 wt. %. The light control sheet of Example 2-5 was obtained in the same manner as in Example 1-3 except for these differences.

Example 2-6

A light control sheet of Example 2-6 was obtained in the same manner as in Example 2-1, except that the thickness of the hard coat layer was changed to 5 μm and the amount of microparticles added was changed to 0.3 wt. %.

Example 2-7

A light control sheet of Example 2-7 was obtained in the same manner as in Example 2-1, except that the amount of acrylic particles added was changed to 4.0 wt. %.

Comparative Example 2-1

A light control sheet of Comparative Example 2-1 was obtained in the same manner as in Example 2-1, except that no acrylic particles were added to the lubricious layer of Example 2-1.

Comparative Example 2-2

A light control sheet of Comparative Example 2-2 was obtained in the same manner as in Example 2-1, except that the hard coat layer of Example 2-1 was not formed.

Evaluation Method

Surface Roughness

A white light interferometer (VertScan, manufactured by Ryoka Systems Inc.) was used to measure the arithmetic mean roughness Ra of the second surface included by the lubricious layer. In this process, the arithmetic mean roughness Ra was measured in a field of view having a rectangular shape, with a width of 1.408 mm and a length of 1.885 mm. The arithmetic mean roughness Ra was measured by the method according to JIS B 0601: 2013.

Measurement of the coefficient of static friction, measurement of the pencil hardness, counting of defects, and measurement of the haze were performed in the same manner as in the examples of the first embodiment. In the present examples, the haze of the base layer was measured in the same manner as the method used to measure the haze of the light control sheet.

Evaluation Result

The coefficient of static friction and pencil hardness of each base layer, as well as the number of defects and haze of each light control sheet, are shown in Table 2 below.

TABLE 2

| | Microparticles (wt. %) | Arithmetic mean roughness Ra (nm) | Thickness of hard coat layer (μm) | Coefficient of static friction | Pencil hardness | Defects | Haze (%) Base layer | 0 V | 40 V |
|---|---|---|---|---|---|---|---|---|---|
| Example 2-1 | 0.2 | 8 | 2 | 0.7 | H | 5 | 0.5 | 7 | 91 |
| Example 2-2 | 2.5 | 52 | 2 | 0.4 | H | 5 | 0.5 | 10 | 92 |
| Example 2-3 | 3.0 | 94 | 2 | 0.1 | H | 7 | 1.9 | 7 | 91 |
| Example 2-4 | 0.1 | 5 | 2 | 1.3 | H | 10 | 0.3 | 6 | 92 |
| Example 2-5 | 0.3 | 8 | 2 | 0.8 | F | 10 | 0.5 | 6 | 91 |
| Example 2-6 | 0.3 | 10 | 5 | 0.5 | 2H | 0 | 0.4 | 6 | 91 |
| Example 2-7 | 4.0 | 122 | 2 | 0.1 | H | 5 | 5 | 15 | 95 |
| Comparative example 2-1 | 0.0 | 3 | 2 | 1.5 | H | 0.3 | 0.3 | 7 | 92 |
| Comparative example 2-2 | 0.2 | 8 | 0 | 0.6 | 2B | 0.5 | 0.5 | 6 | 91 |

As shown in Table 2, it was observed that the base layer of each of Examples 2-1 to 2-7 had the coefficient of static friction within the range of 0.1 or more and 1.3 or less. In contrast, the coefficient of static friction of the base layer of Comparative Example 2-1 was 1.5, and the coefficient of static friction of the base layer of Comparative Example 2-2 was observed to be 0.6. In addition, it was also observed that the base layer of each of Examples 2-1 to 2-7 had the arithmetic mean roughness Ra of the second surface within the range of 5 or more and 122 or less. In contrast, the arithmetic mean roughness Ra of the second surface of the base layer of Comparative Example 2-1 was 3 nm, and the arithmetic mean roughness Ra of the second surface of the base layer of Comparative Example 2-2, was 8 nm.

The pencil hardness of the base layer of each of Examples 2-1 to 2-7 was observed to be within the range of F or higher and 2H or lower. In contrast, the pencil hardness of the base layer of Comparative Example 2-1 was observed to be H, and the pencil hardness of the base layer of Comparative Example 2-2 was observed to be 2B.

The number of defects in the light control sheet of each of Examples 2-1 to 2-7 was observed to be within the range of 0 defects/m 2 or more and 10 defects/m 2 or less. In contrast, the number of defects in the light control sheet of each of Comparative Examples 2-1 and 2 was observed to be 50 defects/m 2 or more.

Therefore, as for the transparent substrates for a liquid crystal device, it was observed that physical damage to the alignment layer is suppressed when the coefficient of static friction between the first and second surfaces of the base layer where the alignment layer is formed is less than or equal to 1.3 and the pencil hardness on the opposite side from the second surface is F or higher. From the viewpoint of suppressing the increase in haze of the base layer, it was observed that the arithmetic mean roughness Ra of the second surface is preferably within the range of 5 nm or more and 94 nm or less.

As described above, according to the transparent substrate for a liquid crystal device and the light control sheet of the second embodiment, the following effects can be obtained in addition to the first three effects described above.

According to the first substrate 11, since the lubricious layer 31 including the second surface 11S2 is provided separately from the support substrate 24, it is possible to reduce restrictions on the configuration of the support substrate 24, including a thickness and a material, as compared to the case where the support substrate 24 includes the second surface 11S2.

Modifications

Each of the embodiments described above can be modified and implemented as follows.

Base Layer

Although the base layer 11A of each embodiment includes the hard coat layer 23, the base layer 11A may not include the hard coat layer 23 if the pencil hardness of F or higher is achieved on the opposite side of the base layer 11A from the second surface 11S2. In this case, for example, the support substrate 24 only has to have a strength high enough to achieve a pencil hardness of F or higher.

Although the base layer 11A of the first embodiment includes the protective layer 26, the base layer 11A may not include the protective layer 26 if the coefficient of static friction between the first surface 11S1 and the second surface 11S2 is achieved to be less than or equal to 1.3. In a case where the base layer 11A does not include the protective layer 26, the adhesive layer 25 for adhering the protective layer 26 to the support substrate 24 is also not necessary. In this case, for example, the support substrate 24 includes a second surface 11S2, and the second surface 11S2 only has to have an arithmetic mean roughness Ra high enough so that the coefficient of static friction between the second surface 11S2 and the first surface 11S1 is less or equal to 1.3.

Although the base layer 11A of the second embodiment includes the lubricious layer 31, the base layer 11A may not include the lubricious layer 31 if the coefficient of static friction between the first surface 11S1 and the second surface 11S2 is less than or equal to 1.3. In this case, for example, the support substrate 24 includes a second surface 11S2 and the second surface 11S2 only has to have an arithmetic mean roughness Ra high enough so that the coefficient of static friction between the first surface 11S1 and the second surface 11S2 is less than or equal to 1.3.

The conductive layer 22 may be positioned between the support substrate 24 and the hard coat layer 23 in the thickness direction of the base layer 11A. Even in this case, since the base layer 11A includes the hard coat layer 23, an effect similar to (1) above can still be provided. In this case, however, the distance between the conductive layer 22 and the first surface 11S1 is increased in the thickness direction of the base layer 11A, which will necessitate a higher voltage to drive the liquid crystal molecules.

Alignment Layer

On the first surface 11S1 included in the alignment layer 21, the pencil hardness may be F or higher. Even in this case, physical damage to the alignment layer 21 can be suppressed. In cases where the pencil hardness of F or higher can be achieved by the strength of the alignment layer 21 without the hard coat layer 23, the base layer 11A may not include the hard coat layer 23.

Light Control Sheet

The type of light control sheet may not be limited to the reverse type but may also be the normal type. In this case, the alignment layer of each of the first substrate 11 and the second substrate 12 may be a horizontal alignment film, and the liquid crystal molecules contained in the light control layer 13 may be p-type liquid crystal molecules. Alternatively, the alignment layer of each of the first substrate 11 and the second substrate 12 may be a vertical alignment film, the liquid crystal molecules contained in the light control layer 13 may be n-type liquid crystal molecules, and the light control sheet 10 may be provided with a pair of polarizing plates that sandwich the pair of substrates 11, 12 in the direction of the thickness of the light control sheet 10.

Liquid Crystal Device

A liquid crystal device to which a transparent substrate for the liquid crystal device according to an embodiment of the present invention is applied is not limited to the light control sheet described above, but may be, for example, a liquid crystal display device.

A reverse type light control sheet includes a light control layer containing liquid crystal molecules, a pair of conductive layers sandwiching the light control layer in the thickness direction of the light control layer, and an alignment layer positioned between the light control layer and each of the conductive layers. In the reverse type light control sheet, the alignment layers cause the liquid crystal molecules to be vertically aligned when no voltage is applied between the pair of conductive layers. In contrast, when a voltage is applied between the pair of conductive layers, the liquid crystal molecules are aligned perpendicular to the electric field formed between the pair of the conductive layers. This allows the reverse type light control sheet to have a relatively low haze when no voltage is applied between the pair of conductive layers and a relatively high haze when a voltage is applied between the pair of conductive layers (see, for example, WO 2017/146217).

The light control sheet and the transparent substrate provided with the alignment layer are required to be able to be manufactured using a roll-to-roll apparatus from the viewpoint of enabling mass production of the light control sheet. When the transparent substrate is manufactured using the roll-to-roll apparatus, external forces may act on the transparent substrate, and thus on the alignment layer provided on the transparent substrate, during conveyance of the transparent substrate by the roll-to-roll apparatus, during winding of the transparent substrate using the roll-to-roll apparatus, and during transportation of the wound transparent substrate, which may cause physical damage to the alignment layer. Thus, a new issue arises with the transparent substrate provided with the alignment layer due to manufacturing of the transparent substrate using the roll-to-roll apparatus.

Such an issue is common, not only to transparent substrates for light control sheets, but also to other transparent substrates for liquid crystal devices that are manufactured using roll-to-roll apparatuses.

A transparent substrate for a liquid crystal device according to an embodiment of the present invention includes an alignment layer that regulates an alignment direction of liquid crystal molecules contained in a liquid crystal layer of the liquid crystal device, and a base layer on which the alignment layer is formed. The transparent substrate includes a first surface and a second surface opposite the first surface. The first surface is a surface of the alignment layer, and the second surface is a surface of the base layer. The coefficient of static friction between the first surface and the second surface is less than or equal to 1.3. The transparent substrate has a hardness of F or higher in a pencil harness test on the first surface or on a surface of the base layer opposite the second surface.

A light control sheet according to an embodiment of the present invention includes the transparent substrate as described above, and a light control layer in contact with the first surface of the transparent substrate and containing liquid crystal molecules.

Obviously, numerous modifications and variations of the present invention are possible in light of the above teachings. It is therefore to be understood that within the scope of the appended claims, the invention may be practiced otherwise than as specifically described herein.

The invention claimed is:

1. A transparent substrate for a liquid crystal device, comprising:
 a base layer; and
 an alignment layer formed on the base layer such that the alignment layer has a surface forming a first surface of the transparent substrate and that the base layer has a surface forming a second surface of the transparent substrate on an opposite side with respect to the first surface,
 wherein the alignment layer regulates an alignment direction of liquid crystal molecules in a liquid crystal layer of a liquid crystal device, the base layer and the alignment layer are formed such that a coefficient of static friction between the first surface and the second surface is 1.3 or less, and the transparent substrate has a hardness of F or higher in a pencil harness test on the first surface or on a surface of the base layer opposite the second surface.

2. The transparent substrate according to claim 1, wherein the base layer includes a hard coat layer, and the transparent substrate has a hardness of F or higher in the pencil harness test on the surface of the base layer on an opposite side with respect to the second surface.

3. The transparent substrate according to claim 2, wherein the base layer includes a conductive layer positioned in contact with the alignment layer such that the conductive layer is positioned between the hard coat layer and the alignment layer in a thickness direction of the transparent substrate.

4. The transparent substrate according to claim 1, wherein the base layer includes a support substrate, an adhesive layer laminated to the support substrate, and a protective layer adhered to the support substrate by the adhesive layer such that the protective layer has the second surface.

5. The transparent substrate according to claim 1, wherein the base layer includes a support substrate, and a lubricious layer laminated to the support substrate and including a plurality of microparticles such that the lubricious layer has the second surface and that the plurality of microparticles includes microparticles partially exposed on the second surface.

6. The transparent substrate according to claim 2, wherein the base layer includes a support substrate, an adhesive layer laminated to the support substrate, and a protective layer adhered to the support substrate by the adhesive layer such that the protective layer has the second surface.

7. The transparent substrate according to claim 2, wherein the base layer includes a support substrate, and a lubricious layer laminated to the support substrate and including a plurality of microparticles such that the lubricious layer has the second surface and that the plurality of microparticles includes microparticles partially exposed on the second surface.

8. The transparent substrate according to claim 3, wherein the base layer includes a support substrate, an adhesive layer laminated to the support substrate, and a protective layer adhered to the support substrate by the adhesive layer such that the protective layer has the second surface.

9. The transparent substrate according to claim 3, wherein the base layer includes a support substrate, and a lubricious layer laminated to the support substrate and including a plurality of microparticles such that the lubricious layer has the second surface and that the plurality of microparticles includes microparticles partially exposed on the second surface.

10. A light control sheet, comprising:
the transparent substrate of claim 1; and
a light control layer positioned in contact with the first surface of the transparent substrate and comprising liquid crystal molecules.

11. A light control sheet, comprising:
the transparent substrate of claim 2; and
a light control layer positioned in contact with the first surface of the transparent substrate and comprising liquid crystal molecules.

12. A light control sheet, comprising:
the transparent substrate of claim 3; and
a light control layer positioned in contact with the first surface of the transparent substrate and comprising liquid crystal molecules.

13. A light control sheet, comprising:
the transparent substrate of claim 4; and
a light control layer positioned in contact with the first surface of the transparent substrate and comprising liquid crystal molecules.

14. A light control sheet, comprising:
the transparent substrate of claim 5; and
a light control layer positioned in contact with the first surface of the transparent substrate and comprising liquid crystal molecules.

15. A light control sheet, comprising:
the transparent substrate of claim 6; and
a light control layer positioned in contact with the first surface of the transparent substrate and comprising liquid crystal molecules.

16. A light control sheet, comprising:
the transparent substrate of claim 7; and
a light control layer positioned in contact with the first surface of the transparent substrate and comprising liquid crystal molecules.

17. A light control sheet, comprising:
the transparent substrate of claim 8; and
a light control layer positioned in contact with the first surface of the transparent substrate and comprising liquid crystal molecules.

18. A light control sheet, comprising:
the transparent substrate of claim 9; and
a light control layer positioned in contact with the first surface of the transparent substrate and comprising liquid crystal molecules.

* * * * *